(12) United States Patent
Letkeman et al.

(10) Patent No.: US 7,590,933 B2
(45) Date of Patent: Sep. 15, 2009

(54) METHOD FOR DISPLAYING AN ANNOTATED FILE

(75) Inventors: Kim Letkeman, Nepean (CA); Geoffrey M. Clemm, Concord, MA (US); Scot A. Aurenz, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 10/990,906

(22) Filed: Nov. 17, 2004

(65) Prior Publication Data

US 2006/0107220 A1    May 18, 2006

(51) Int. Cl.
*G06F 15/00* (2006.01)
*G06F 17/00* (2006.01)

(52) U.S. Cl. .............. 715/230; 715/231; 715/232; 715/209; 715/210; 715/762; 715/705; 715/711; 715/715; 715/713; 715/747; 715/763; 717/124; 717/125; 717/126; 717/110; 717/112; 717/113; 717/111; 717/105; 717/104

(58) Field of Classification Search ............. 715/512, 715/514–6, 705, 711, 715, 713, 747, 762, 715/763; 717/124–6, 104, 110–3, 105
See application file for complete search history.

(56) References Cited

U.S. PATENT DOCUMENTS

| | | | |
|---|---|---|---|
| 2004/0003371 A1* | 1/2004 | Coulthard et al. | 717/101 |
| 2004/0177343 A1* | 9/2004 | McVoy et al. | 717/122 |
| 2004/0230886 A1* | 11/2004 | Livshits | 715/500 |
| 2005/0166193 A1* | 7/2005 | Smith et al. | 717/143 |
| 2006/0031226 A1* | 2/2006 | Cope et al. | 707/10 |

OTHER PUBLICATIONS

Holzner, Steve, Eclipse, Publisher: O'Reilly, Pub Date: Apr. 2004, pp. 1-4.*
Eclipse 3.0 News, Eclipse 3.0—New and Noteworthy Text, Jun. 25, 2004, IBM, pp. 1-9.*
Gamma, Erich, et al., Contributing to Eclipse: Principles, Patterns, and Plug-Ins; Publisher: Addison Wesley Professional; Pub Date: Oct. 20, 2003; pp. 1-11.*

* cited by examiner

*Primary Examiner*—Doug Hutton
*Assistant Examiner*—Nathan Hillery
(74) *Attorney, Agent, or Firm*—Guerin & Rodriguez, LLP; Michael A. Rodriguez

(57) ABSTRACT

A method and system for displaying an annotated file are described. The method includes associating an annotation with a programming module of a baseline file and displaying in a window of a graphical user interface the baseline file as a tree structure having a plurality of nodes. Each node represents a programming module of the baseline file. The method also includes displaying the annotation proximate to the node that represents the programming module with which the annotation is associated. The annotation includes at least one message indicative of a modification made to the baseline file by a contributor.

15 Claims, 7 Drawing Sheets

METHOD FOR DISPLAYING AN ANNOTATED FILE

FIELD OF THE INVENTION

The invention relates to a system and a method for displaying an annotated programming file. More specifically, the invention relates to a graphical user interface and related methods for displaying a portable annotated programming file.

BACKGROUND OF THE INVENTION

Structured information such as a Unified Modeling Language (UML) model is often stored in the Extensible Markup Language (XML), which provides a simple method for storing machine-readable hierarchical data. A UML model is highly structured with overlays for a class hierarchy, a containment hierarchy (parent-child) and a mesh network of references implemented using internal and external (cross-model) references.

An instance of a UML model can grow to encompass a large number of components or subsystems. The possibility that a number of developers and/or modelers will make simultaneous changes increases dramatically as the file grows in size. For example, with a large UML model, one person could be working with embedded diagrams while another could be restructuring the package hierarchy of a system. The potential for conflicting changes is high, because classes can move and diagrams (that likely reference one or more classes) can change. Parallel development is common in large development teams. Each time two contributors work simultaneously on the same file, a merge of the changes is performed when the second person checks the file back into a source control system, such as CLEARCASE sold by IBM of Armonk, N.Y.

The complexity of structured data forces the user performing the merge (i.e., the merger) to examine conflicting changes (deltas) and to select from the alternatives to resolve all changes before proceeding to commit the changes to the file. As shown in FIG. 1, a current visualization technology (e.g. version control systems with merge functions) handles structured data in a cumbersome way using a significant portion of screen space. Typically, the user is presented with a window 26 containing the common file for the merge, a left-hand window 14 and a right-hand window 18 containing merge contributors, and a fourth window containing the merged file 22. Another window 10 includes a description of the differences among the files.

As shown, the merger sees many small windows and must constantly interpret deltas with minimal visible context. The eye must scan constantly from left to right and back, also moving up and down the screen to process the full meaning of each delta. The software's task of marking all related information in the windows is complex. The markings must not obscure the meaning of the data, but must indicate all related items to create a strong relationship between them in the user's mind.

SUMMARY OF THE INVENTION

In one aspect, the invention features a computer-executed method of displaying changes to a data file comprising associating an annotation with a programming module of a baseline file on a computer and displaying on a display of the computer in an unsegmented window of a graphical user interface the baseline file as a tree structure having a plurality of nodes. Each node represents a programming module of the baseline file. The annotation is displayed, on the display of the computer in the unsegmented window of the graphical user interface, proximate to the node that represents the programming module with which the annotation is associated. The annotation includes a plurality of selectable messages displayed proximate to each other in order to facilitate visual comparison. Each selectable message describes a modification made to the baseline file by a different contributor. The annotation indicates that the modifications produce a conflict. The conflict is resolvable within the unsegmented window by a selection of one of the selectable messages.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

As a general overview, the invention is directed to a system and method of displaying an annotated file. A graphical user interface displays the annotated file as a tree structure having a plurality of programming modules. Various annotations are associated with respective programming modules. The annotations provide details related to changes to a baseline file that resulted in the annotations. The annotations are configured to indicate an annotation type (e.g., a conflict). If the annotation indicates a conflict, the user interface allows the user to select among conflicting changes to resolve the conflict.

Figure 2:
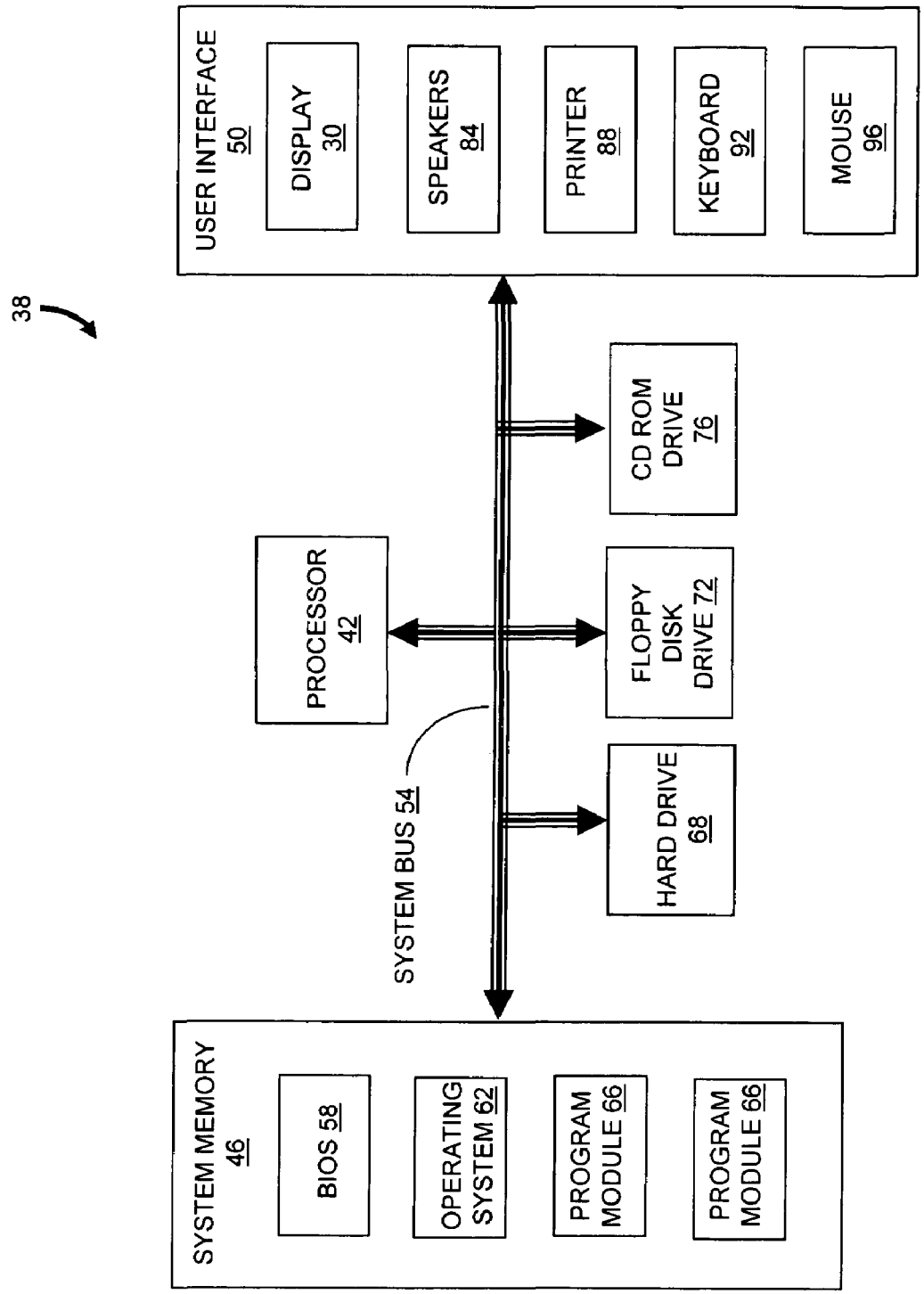
FIG. 2 is a block diagram of an embodiment of a computer system in which principles of the present invention may be practiced.

FIG. 2 is a functional block diagram of an embodiment of a personal computer (PC) 38 in which principles of the present invention can be practiced. The PC 38 includes a processor 42, a system memory 46 and a user interface 50 coupled to each other over a system bus 54. The system memory 46 includes read-only memory (ROM) and RAM. Basic routines used to transfer information between the components of the PC 38 at certain times, such as during startup, are included in a basic input/output system (BIOS) 58 in ROM. The BIOS 58 provides an interface between the PC's operating system 62 (e.g., Windows, Mac OS, Linux) and the specific hardware configuration of the PC 38, including the processor 42 and the system memory 46. The system memory 46 also includes various program modules 66 such as word processing applications, presentation applications, spreadsheet applications, and an application for displaying an annotated file according to principles of the invention.

The PC 38 generally includes other components, for example one or more hard disk drives 68, magnetic disk drives 72, optical disk drives 76 and the like. The drives 68, 72, 76 enable read-from and write-to operations for various forms of computer-readable media and allow for non-volatile storage of computer readable instructions, data structures and other data. The user interface 50 includes a display 30 for displaying a graphical user interface of the present invention and other peripheral output devices, such as speakers 84 and a printer 88, connected through various interface modules (not shown) to the system bus 54. Commands and information are entered into the PC 38 through input devices such as a keyboard 92 and a mouse 96, which has an associated pointing device (e.g., cursor) that is displayed on the display 30.

Figure 3:
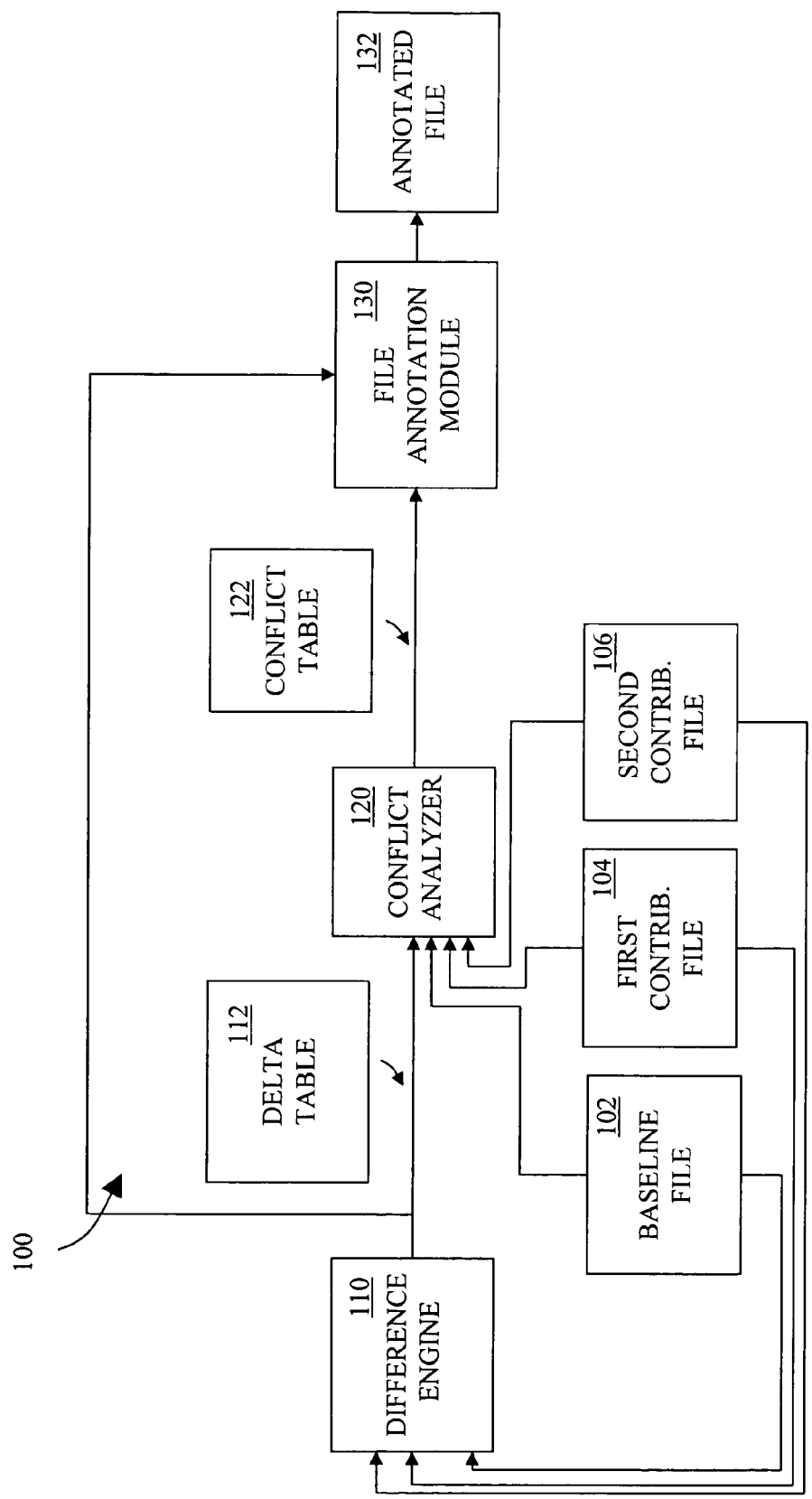
FIG. 3 is a block diagram of an embodiment of a system for generating an annotated file according to the principles of the invention.

FIG. 3 depicts an embodiment of an annotated file generation system 100. The system 100 includes a difference engine module 110, a conflict analyzer module 120, and a file annotation module 130. The difference engine module 110 communicates with the conflict analyzer module 120 and the file annotation module 130. The conflict analyzer module 120 communicates with the difference engine module 110 and the file annotation module 130. In one embodiment, each of the modules 110, 120, and 130 are software based, although hardware can also be used.

As a general overview of the operation of the annotated file generation system 100, the difference engine module 110 receives a baseline file 102, a first contributor file 104, and a second contributor file 106 from the source management system. As used herein, baseline file refers to the file without any modifications (i.e., a starting point). Contributor file refers to a copy of the baseline file 102 that is modified by a contributor. It should be noted that the present invention is not limited to two contributor files. Contributor files can include but are not limited to EMF files, UML files and Java files. In one embodiment, the difference engine module 110 creates a table of deltas 112 (i.e., changes) after analyzing the baseline file 102 and contributor files 104,106. The conflict analyzer module 120 reviews the baseline file 102, the contributor files 104,106, and the results of the difference engine module 110 and determines if conflicting changes exist in the contributor files 104, 106. In one embodiment, the conflict analyzer module 120 stores the results in a conflicts table 122. The file annotation module 130 copies the baseline file 102 and incorporates the results of the difference engine module 110 and conflict analyzer module 120 as annotations to the copy of the baseline file 102 to create an annotated file 132.

Further details regarding the operation of the system 100 can be found in copending U.S. patent application Ser. No. 10/852,791, titled "PORTABLE ANNOTATED MERGE MODEL AND METHODS OF USING THE SAME," filed on May 25, 2004, the entire contents of which are herein incorporated by reference.

Figure 4:
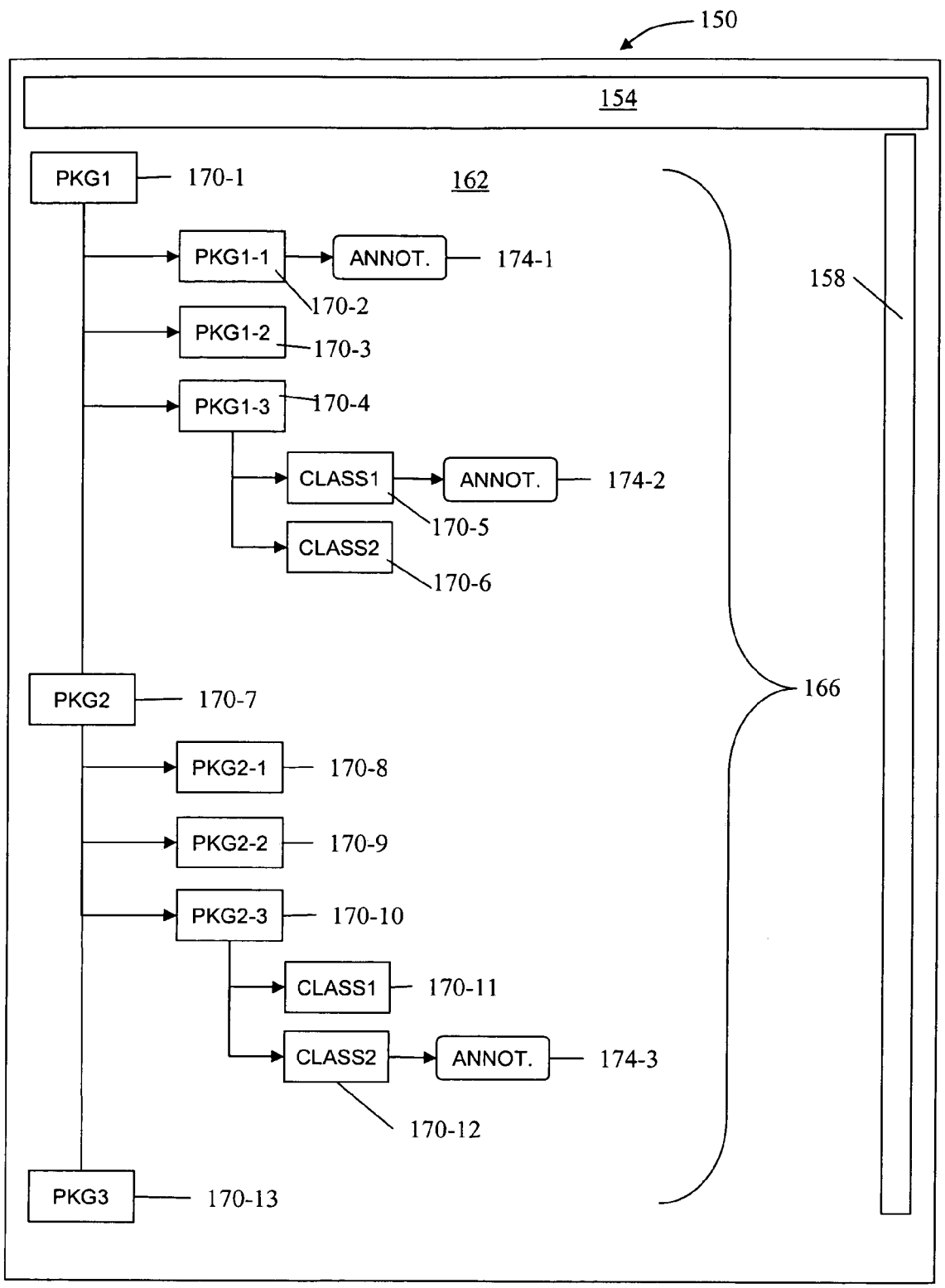
FIG. 4 is an embodiment of a graphical user interface constructed according to principles of the invention.

FIG. 4 depicts an embodiment of a graphical user interface 150 (also referred to as user interface 150) constructed according to principles of the invention. The graphical user interface 150 includes a menu bar 154, a scroll bar 158, and a display area 162. The menu bar 154 includes a plurality of menus (not shown) for performing various functions as is known to those of ordinary skill in the art. The scroll bar 158 includes a position indicator (not shown) for providing vertical scrolling and indicating a location within the display area 162. A second scroll bar (not shown) can be located along the bottom of the user interface 150 to provide horizontal scrolling capabilities.

Figure 1:
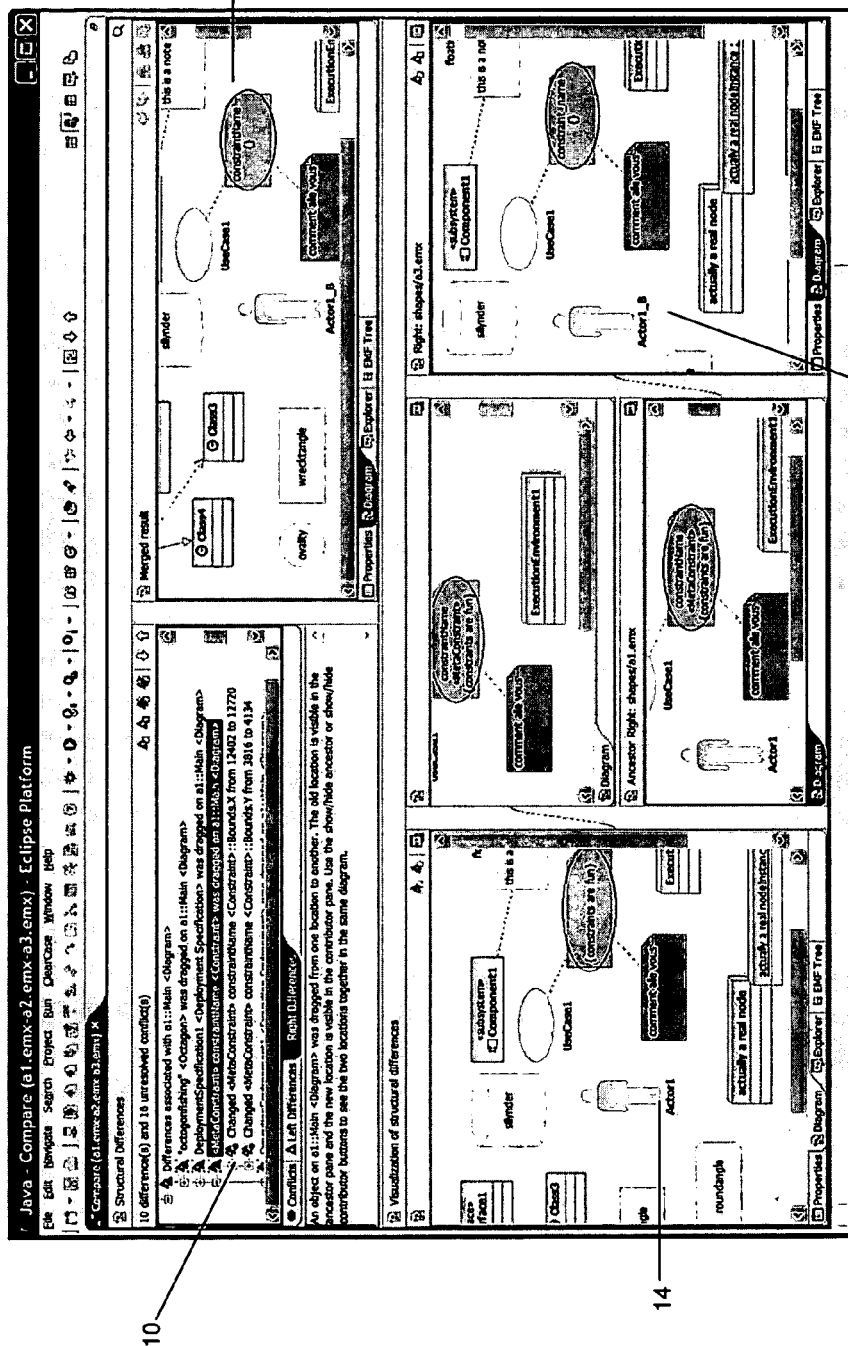
FIG. 1 is a prior art graphical user interface for a merge tool.

The display area 162 is configured to display graphically the various contents of the annotated file 132. In one embodiment, the display area 162 is a single window. That is, the display area is not segmented into multiple windows as shown in FIG. 1. This configuration is advantageous because it allows a viewer of the display 30 to focus attention upon a single region as opposed to multiple areas and allows for an increased amount of the contents of the annotated file 132 to be displayed when compared to conventional methods. The configuration also allows for ease of navigation within the display area.

The annotated file 132 is displayed as tree structure 166. As used herein, tree structure refers to a data structure, consisting of interconnected objects called nodes. There are two types of nodes, nodes that have sub-nodes, called children, and nodes that have no children. Nodes with children are known as branches, nodes without children are known as leaf nodes. The root node is the top-level node in a tree structure. Parent nodes are nodes that have children. Parent nodes can also be children. There are also more complex combinations of nodes, and the normal family classifications apply (ancestors, grandparents, cousins and uncles, etc.) The tree structure 166 includes various programming modules 170-1, 170-2, 170-3, . . . 170-X (referred to generally as programming modules 170) and annotations 174-1, 174-2, 174-3, . . . , 174-X (referred to generally as annotation 174). Programming modules can include, but are not limited to, packages, classes, diagrams and the like. Each programming module 170 can include various sub-programming modules that are related to the programming module 170. For example, programming module 170-2 is a sub-programming module of programming module 170-1.

In one embodiment, the annotation 174 is displayed proximate to the programming module 170. Displaying the annotation 174 proximate to the programming module 170 indicates that the annotation 174 is associated with the respective programming module 170. The annotation 174 can be linked to the programming module 170 with a graphical link such as an arrow or a line. In another embodiment, the annotation 174 is hidden from view until the viewer positions the pointer associated with the mouse 96 in proximity of the programming module 170.

Figure 5A:
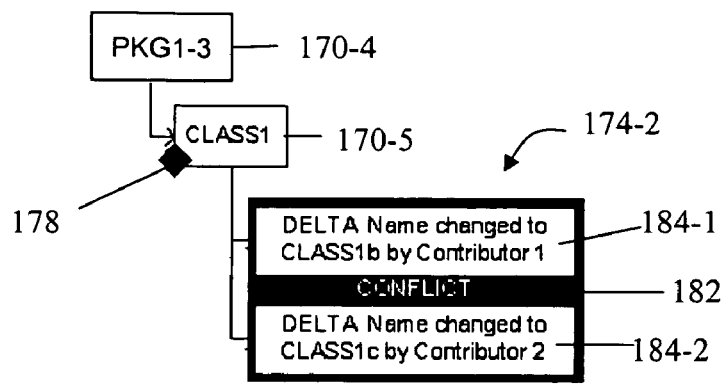
FIGS. 5A-5C are embodiments of graphical representations of annotations that can be associated with a baseline file.
Figure 5B:
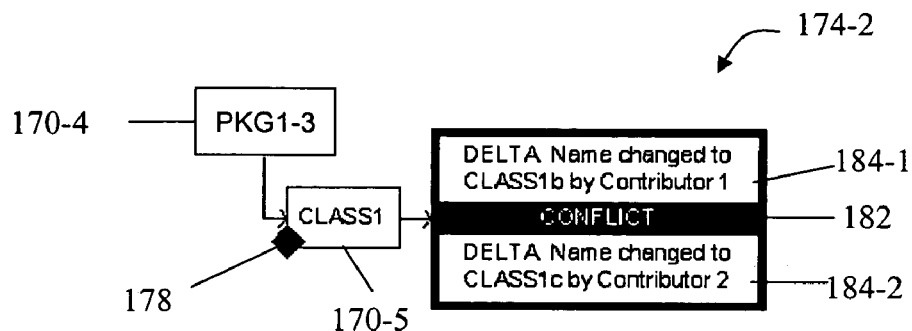
Figure 5C:
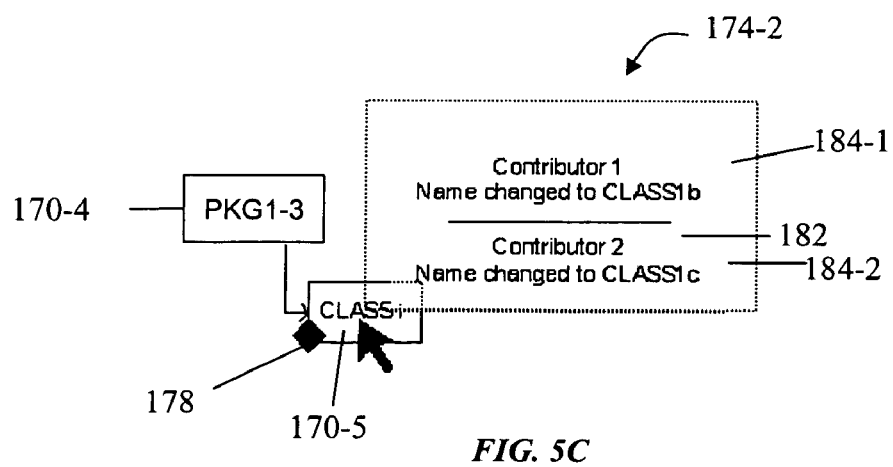

FIGS. 5A, 5B, and 5C depict different embodiments for displaying an annotation 174 according to principles of the invention. In general, each annotation 174 includes a graphical indicator 178 and a message area 182. The graphical indicator 178 can have a color to indicate the type of annotation 174 that is associated with the programming module 170. For example, the color red can indicate that the annotation 174 identifies a conflict. Other types of annotations can include, but are not limited to, adds, changes, moves, deletes, and reorders. Different colors and identifiers other than color can be used to indicate an annotation type. The message area 182 includes at least one message 184 that provides details about the changes to the contributor file that resulted in the annotation 174.

An exemplary annotation 174-2 is associated with programming module 170-5. The graphical indicator 178 is displayed proximate to the programming module 170-5. The message area 182 includes a first message 184-1 and a second message 184-2. Each message 184 indicates that the respective contributors made a change to the name of the programming module 170-5 in their respective contributor files 104, 106. If the tree structure 166 is compressed, the graphical indicator 178 appears at the top node (i.e., the graphical indicator propagates up the tree structure 166 to the highest displayed node). This allows the merger to locate nodes with annotations at a quick glance. Further, the merger can navigate among the annotations using buttons (not shown) or menus (not shown) such as, jump to the first annotation or the last annotation, move the next annotation or the previous annotation, and move to the next unresolved annotation or the previous unresolved annotation.

In FIG. 5A, the annotation 174-2 is displayed as part of the tree structure 166 on a level below the programming module 170-5. FIG. 5B shows the annotation 174-2 being displayed on the same level as the programming module 170-5. FIG. 5C shows that the annotation 174-2 is originally hidden from view. When the pointer is placed proximate the programming module 170-5, the annotation 174-2 is shown.

Figure 6:
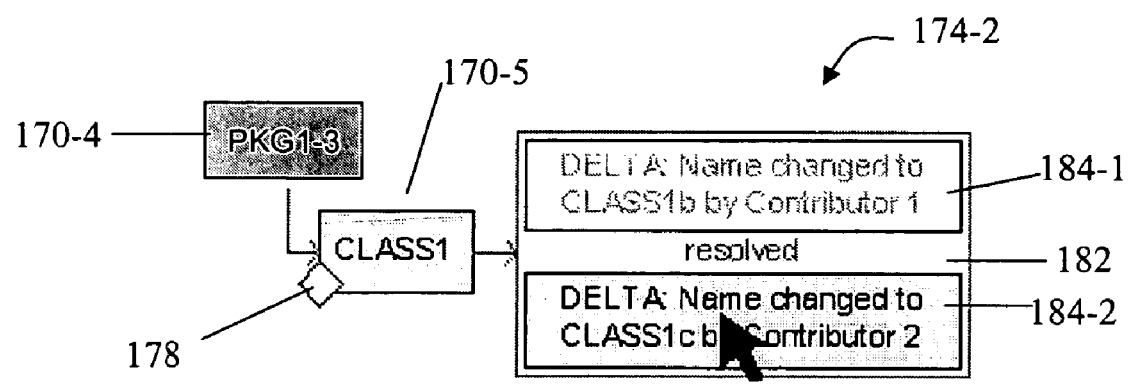
FIG. 6 is an embodiment of the annotation of FIG. 5B after the conflict is resolved.

FIG. 6 shows an embodiment of the annotation 174-2 after the conflict is resolved. As shown, the second message 184-2 of the message area 182 is selected. In response, the appearance of the first message 184-1 and the second message 184-2 changes. It should be understood that the cursor can be used to select and deselect either message 184-1, 184-2 to resolve the conflict. In one embodiment, the colors of the selected message and the unselected message change. For example, the unselected message (i.e., the second message 184-2) can become grayed or faded while the selected message (i.e., the first message 184-1) can become highlighted. Also, the appearance of the graphical indicator 178 can change. For example, the color of the graphical indicator 178 can change from red to green to indicate that the conflict is resolved. Changes in appearance to the programming modules 170 associated with the annotation 174-2 can also indicate the conflict resolution.

Figure 7:
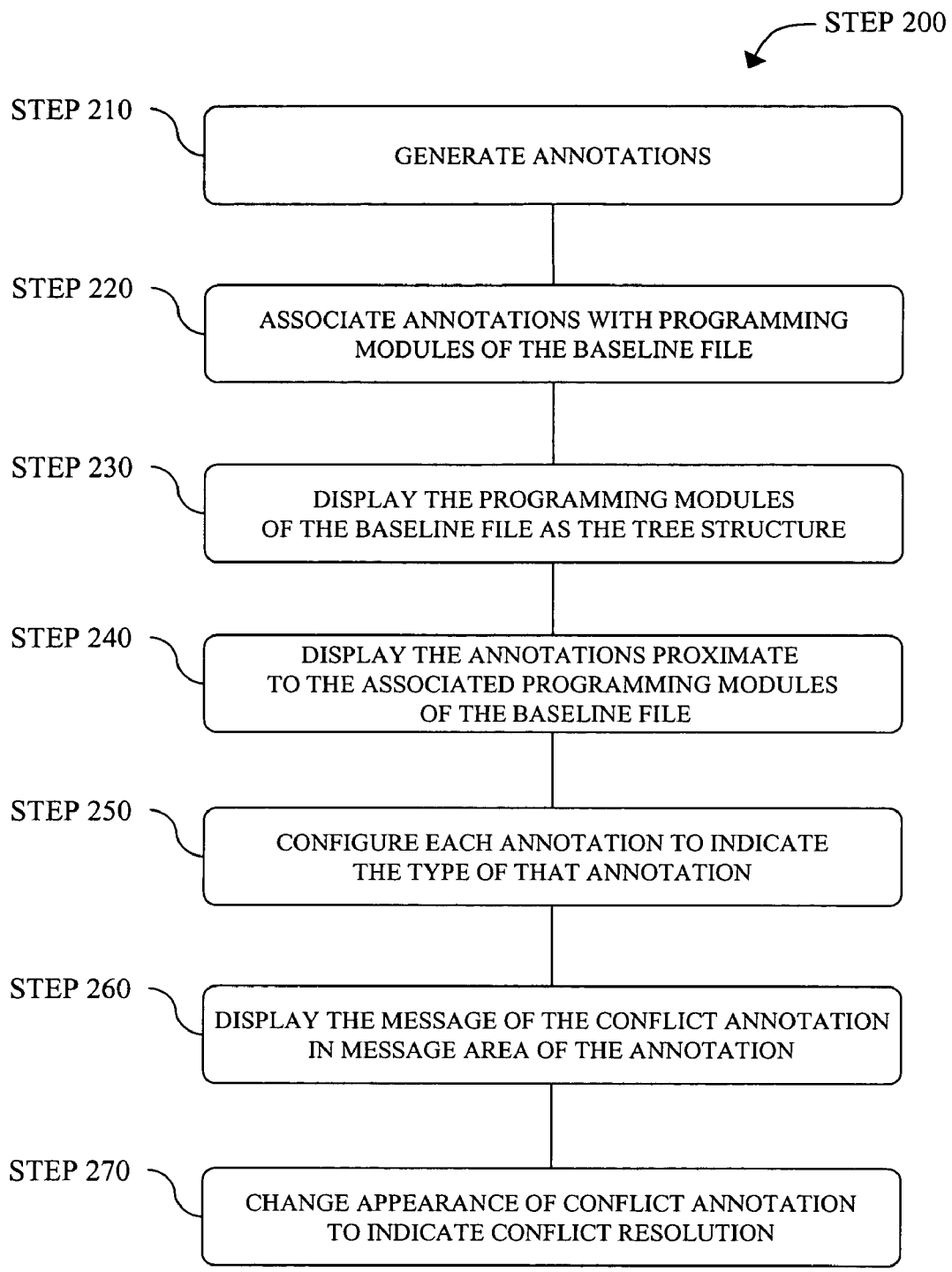
FIG. 7 is an embodiment of a method of displaying an annotated file according to principles of the invention.

FIG. 7 depicts one embodiment of a method 200 of displaying the annotated file 132. Initially, the annotated file generation system 100 (FIG. 3) generates (step 210) an annotation 174. The system 100 associates (step 220) the annotation 174 with a programming module 170 of the baseline file 102. The programming modules 170 are displayed as the tree structure 166 (step 230) on the display 30. Also, the annotations 174 are displayed (step 240) proximate to the associated programming modules 170. Each annotation 174 is configured (step 250) to indicate the type (e.g., conflict) of the annotation 174. Configuring the annotation can include any one of or any combination of displaying the graphical indicator 178, coloring the graphical indicator 178, coloring the annotation 174, and highlighting the annotation 174. If an annotation 174 is a conflict annotation, the messages 184 are shown (step 260) in the message area 182 to provide information explaining what changes each contributor made to the baseline file 102 that resulted in the conflict generation. The viewer can resolve the conflict by selecting one of the messages 184 of the conflict annotation 174. In response, the appearance of the conflict annotation 174 is changed (step 270) to indicate resolution of the conflict.

While the invention has been shown and described with reference to specific preferred embodiments, it should be understood by those skilled in the art that various changes in form and detail may be made therein without departing from the spirit and scope of the invention as defined by the following claims. For example, although described as a method and data file the invention can be embodied as a computer readable medium (e.g., compact disk, DVD, flash memory, and the like) that is sold and distributed in various commercial channels. Also, the computer readable instructions contained on the computer readable medium can be purchased and download across a network (e.g., Internet). While the invention has been described in terms of structured data (e.g., XML), the methods can be applied to any file format, including Java and C++ source files.

What is claimed is:

1. A computer-executed method of displaying changes to a data file comprising:
    associating an annotation with a programming module of a baseline file on a computer;
    displaying on a display of the computer in an unsegmented window of a graphical user interface the baseline file as a tree structure having a plurality of nodes, each node representing a programming module of the baseline file; and
    displaying the annotation, on the display of the computer in the unsegmented window of the graphical user interface, proximate to the node that represents the programming module with which the annotation is associated, the annotation including a plurality of selectable messages displayed proximate to each other in order to facilitate visual comparison, each selectable message describing a modification made to the baseline file by a different contributor, the annotation indicating that the modifications produce a conflict, the conflict being resolvable within the unsegmented window by a selection of one of the selectable messages.

2. The computer-executed method of claim 1 wherein the annotation indicates an annotation type.

3. The computer-executed method of claim 1 wherein displaying the annotation comprises displaying the annotation in a particular color to indicate the unresolved conflict.

4. The computer-executed method of claim 1 further comprising generating the annotation prior to associating the annotation with the programming module of the baseline file.

5. The computer-executed method of claim 1 wherein the displaying of the annotation occurs when a cursor moves proximate to a graphical representation of the tree structure and wherein the annotation disappears when the cursor moves away from the graphical representation.

6. The computer-executed method of claim 1, wherein the annotations identifies the contributors of the modifications.

7. The computer-executed method of claim 1, wherein the displayed annotation is part of the displayed tree structure.

8. The computer-executed method of claim 7, wherein the displayed annotation appears on a level of the displayed tree structure equal to a level of the node that represents the programming module.

9. The computer-executed method of claim 7, wherein the displayed annotation appears on a level of the displayed tree structure that is a sub-level of the node that represents the programming module.

10. The computer-executed method of claim 1, wherein the node and annotation are concurrently visible in the unsegmented window.

11. The computer-executed method of claim 1, further comprising generating an annotation file by:
    generating a copy of the baseline file;
    comparing contributor files with the copy of the baseline file to identify one or more modifications by each contributor to the baseline file;
    incorporating each identified modification as an annotation in the copy of the baseline file;
    storing the copy of the baseline file with the annotations as the annotation file.

12. The computer-executed method of claim 2, wherein the annotation type identifies for each modification whether that modification is an addition, deletion, movement, change, reordering, or conflict.

13. The computer-executed method of claim 3, further comprising changing the color of the annotation to indicate that the conflict is resolved.

14. The computer-executed method of claim 1, further comprising graying out an unselected message after the user resolves the conflict by selecting one of the displayed messages.

15. The computer-executed method of claim 14, further comprising updating the annotation to indicate that the conflict is resolved.

* * * * *

UNITED STATES PATENT AND TRADEMARK OFFICE
CERTIFICATE OF CORRECTION

PATENT NO.       : 7,590,933 B2                                   Page 1 of 1
APPLICATION NO.  : 10/990906
DATED            : September 15, 2009
INVENTOR(S)      : Letkeman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Fourteenth Day of December, 2010

David J. Kappos
*Director of the United States Patent and Trademark Office*